Sept. 5, 1967   B. STARZYK   3,339,740
CENTRIFUGAL-TYPE OIL RECONDITIONER HAVING
DEFLECTING AND SETTLING PARTITIONS
Filed April 30, 1964

BORIS STARZYK
INVENTOR.

BY J. O. St. Palley
Patent Agent 3,339,740
CENTRIFUGAL-TYPE OIL RECONDITIONER HAVING DEFLECTING AND SETTLING PARTITIONS
Boris Starzyk, 60 Palmer Road,
Branford, Conn. 06405
Filed Apr. 30, 1964, Ser. No. 363,709
2 Claims. (Cl. 210—195)

My invention relates to oil cleaners and reconditioners and has particular utility in the reconditioning of the lubricating oil used in the internal combustion engines.

In the internal combustion engines the lubricating oil is subjected to partial oxidation the products of which tend to form a sludge; it will gather also various other contaminants, such as carbon, water, minute metal particles and dirt from the atmosphere brought in through the carburetor. When these contaminants reach a certain amount the further use of the oil as a lubricant will be highly detrimental for the engine. In view of this, it is a common practice to drain the oil and replace it by new oil after certain length of operation of the engine. The frequency of these oil changes may be reduced somewhat by the application of filters, usually in the form of replaceable cartridges, but the replacement of these cartridges will represent an additional cost.

It is a well known opinion of the experts that the partial oxidation of the lubricating oil in the internal combustion engines will not impair the lubricating quality of the oil provided the products of this oxidation are completely removed from the oil. As a matter of fact, some experts believe that, as the oxidation affects the comparatively unstable elements or components of the oil, after the oxidized products are removed, the remaining oil should be more stable and more durable than the original oil.

The important object of my invention is to eliminate this costly waste of the lubricating oil generally practiced at present, and also to reduce the wear of the internal combustion engines by providing a simple device which will keep the oil in perfect lubricating condition by removing the contaminants practically as soon as they are formed, so that the dangerous accumulation of the contaminants is effectively prevented.

Another important object of my invention is to provide an oil reconditioner which will operate effectively in conjunction with any type of internal combustion engines, including those employed in the various kind of motor vehicles, and which will require the minimum amount of service as the contaminants can be drained in a very few minutes, even without the necessity of stopping the engine.

A further object of my invention is to provide an oil reconditioner which is economical in first cost and also in maintenance and which employs no cartridge to be renewed.

Other objects and advantages of my invention will be apparent during the course of the following description.

Figure 1:
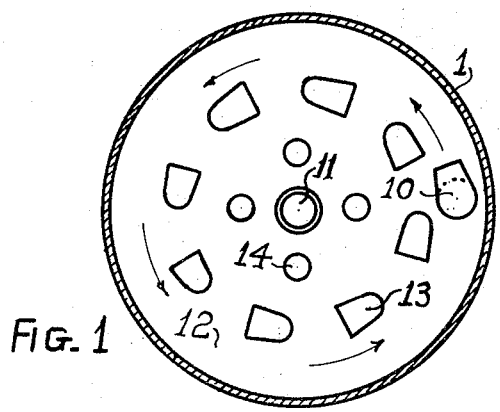
Figure 3:
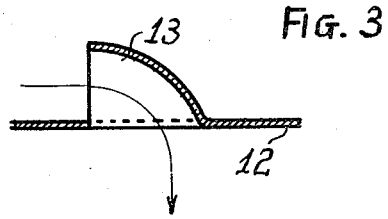
Figure 4:
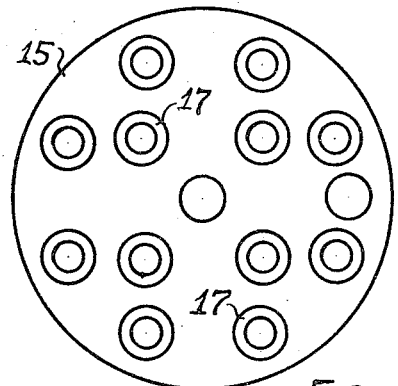
Figure 2:
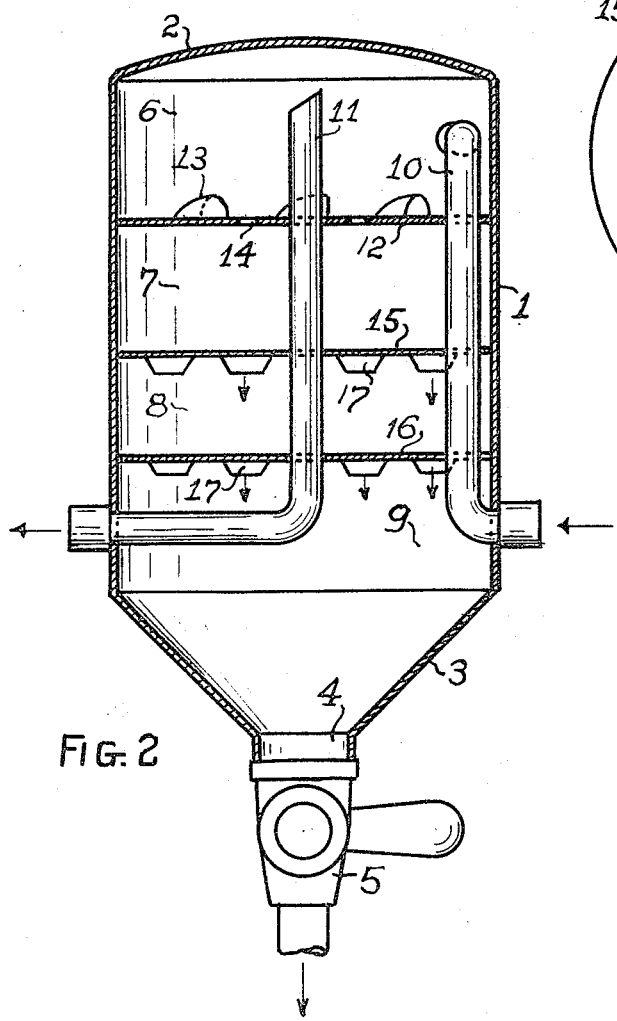
Figure 5:
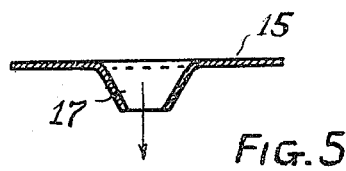

In the accompanying drawing, forming a part of this application, wherein for the purpose of illustration is shown a preferred form of my invention, FIGURE 1 is a horizontal sectional view of the preferred form of my oil reconditioner, FIGURE 2 is a vertical sectional view of the same, FIGURE 3 is a sectional view of the deflectors, FIGURE 4 is a plan view of the settling partitions, FIGURE 5 is a sectional view of the conical openings of said settling partitions.

Referring to the drawing, the numeral 1 designates the casing which, in the preferred form illustrated is cylindrical in shape and is provided with a permanently secured dome-shaped cover 2, and a conical bottom 3 having a drain opening 4. Secured to the drain opening is the drain valve 5.

The casing 1 is divided into four chambers by circular horizontal partitions. Adjacent to the cover 2 is the receiving chamber 6, which receives the oil from the oil line of the engine through the intake pipe 10. It is important in my invention that the upper end of the intake pipe is formed into a horizontal nozzle directed tangentially, so that the oil coming from the intake pipe at considerable velocity and pressure will cause and maintain a lively circulation in the receiving chamber 6. This circulation of the oil in the receiving chamber 6 serves two important purposes: it will set up a centrifugal force which will divert the contaminants from the center portion of the chamber 6 toward the periphery, the contaminants being heavier than the oil; this circular motion of the oil in the receiving chamber 6 will greatly extend the time until the oil reaches the entrance of the outlet pipe 11, thereby making it possible for the contaminants to be separated from the lighter oil and continue the circulating movement at the lower level of the receiving chamber 6. It is essential for this purpose that the outlet pipe 11 should be located in the center of the receiving chamber 6 with the entrance opening being at higher level than the upper end of the intake pipe 10, as shown in FIG. 2.

Located under the receiving chamber 6 is the deflecting chamber 7, in which the horizontal circulation of the oil is deflected into a vertical circulating movement in order to complete the separation of the heavier contaminants from the lighter oil. This change in the movement of the oil is accomplished by the deflecting partition 12, separating the receiving chamber 6 from the deflecting chamber 7. This partition 12, the plan view of which is shown in FIG. 1, has the following important features. Arranged in a circle near the periphery of the partition 12 are the deflectors 13 projecting above the surface of the partition 12, which have semicircular entrance opening facing the movement of the circulating oil of the lower level of chamber 6, and a curved back wall, shown in a larger scale in FIG. 3, which will deflect the horizontal motion of the circulating oil of chamber 6 downwardly. The partition 12 is provided also with plain holes 14 located in the central portion of the partition 6, and shown in FIG. 1, which will permit the return of the lighter oil from chamber 7 to chamber 6 when displaced by the oil forced by the deflectors 13 into the chamber 7. The important function of the deflectors 13 is to trap the contaminants circulating in the lowest region of the receiving chamber 6 and direct it downwardly into the chamber 7, thereby setting up circulations in vertical planes within the chamber 7, as a result of which and due to combined effect of the centrifugal and gravitational forces the heavier contaminants will be completely separated from the lighter oil.

The thus separated contaminants will sink into the partition 15 forming the base of the chamber 7 and separating it from the adjacent lower chamber 8, called the settling chamber. The partition 15, a plan view of which is shown in FIG. 4, is provided with a multiplicity of drawn conical holes 17. The partition 16, forming the bottom of the settling chamber 8, is also provided with a multiplicity of drawn conical holes 17, similarly to the partition 15. The function of these partitions 15 and 16 and the holes 17 is to slow down the circulating movement of the oil and thereby promote the settling of the contaminants and also to permit the passage of the contaminants from the chamber 7 into the chamber 8 and from the chamber 8 into the chamber 9, called the sludge chamber. This chamber 9 occupies the lowest portion of the casing 1, having the function of the collecting of the sludge; it is provided with a sloping conical bottom and a valve of ample size to facilitate the convenient and the complete draining of the sludge.

The operation of my invention is as follows: In the internal combustion engines the lubricating oil is kept in constant circulation at considerable velocity and pressure by the oil pump. My oil reconditioner is connected into the oil system of the engine so that the oil coming from the oil pump of the engine will enter my device through the intake pipe 10 and the reconditioned oil will return to the engine through the outlet pipe 11, shown in FIG. 2, maintaining a pressure within my device as long as the engine is running. Due to the tangential position of the upper end of the intake pipe 10 the oil entering at high velocity will keep the oil contained within the receiving chamber 6 in rapid circulation around the vertical axis formed by the outlet pipe 11, which is located in the center of the receiving chamber 6. Due to the combined effect of the centrifugal force produced by the circulation of the oil and the gravitational force, the contaminants, being heavier than the clean oil, will move toward the periphery and simultaneously will gradually sink to the lower portion of the receiving chamber 6, whereas the clean oil will move toward the center of the upper region of the chamber 6, where it will find exit through the outlet pipe 11.

The contaminants circulating in the lowest peripheral portion of the receiving chamber 6 will be trapped and deflected downwardly by the curved back wall of the deflectors (see FIG. 3) projecting above the surface of the partition 12 and having their entrance opening directed to meet the flow of the circulating contaminant. As a result of the function of the deflectors 13 the contaminants will enter the chamber 7 and will circulate in vertical planes and the combined effect of the centrifugal and gravitational forces will complete the separation of the contaminants so that the heavy contaminants sink to the partition 15 and the lighter clean oil will rise and reenter the chamber 6, through the holes 14, to find exit through the outlet pipe 11.

The heavy contaminants sunk to the partition 15 will pass through the conical holes 17 into the chamber 8 and gradually will lose their velocity and begin to settle. Finally the heavy contaminants will pass through the conical holes of the partition 16 and will settle in the chamber 9 as a sludge. By opening the drain valve 5 this sludge will be forced out by the pressure existing in the oil system of the engine, so that the sludge can be removed completely from the device.

It is to be understood that the form of my invention herein described and illustrated is only an example of the same, and various changes in the shape, size, and arrangements of parts may be resorted to, without departing from the spirit of my invention or the scope of the subjoined claims.

I claim:
1. An oil reconditioner comprising a cylindrical casing adapted to hold oil under pressure and having four chambers; a receiving chamber occupying the top portion of said casing; an intake pipe extending from the outside of the casing to the interior of said receiving chamber to deliver oil into said receiving chamber, the end of said intake pipe within said receiving chamber forming a horizontal nozzle tangentially arranged to cause the circulation of the oil within said receiving chamber by the force of the incoming oil; an outlet pipe located in the central portion of said receiving chamber and extending to the outside of said casing to deliver oil from said receiving chamber to the outside; a deflecting chamber located under said receiving chamber; a deflecting partition separating said receiving chamber from said deflecting chamber, and being provided in its peripheral portion with deflectors having their entrance openings facing the circulating oil and curved back walls deflecting said oil downwardly into said deflecting chamber, said deflecting partition being provided also with holes in its central portion for the return of the clean oil into the receiving chamber; a settling chamber located under said deflecting chamber; an upper settling partition separating said deflecting chamber from said settling chamber and a lower settling partition forming the bottom of said settling chamber, said settling partitions being provided with conical holes permitting the passing of the contaminants of the oil; a sludge chamber located in the lowest portion of said casing and being provided with a conical bottom, a drain hole and a drain valve for the complete draining of the sludge from said sludge chamber.

2. An oil reconditioner comprising a closed casing adapted to hold oil under pressure and having four communicating chambers; a receiving chamber occupying the top portion of said casing; an intake pipe delivering oil into said receiving chamber through a horizontal and tangential nozzle producing a horizontal circulation of the oil in said receiving chamber; an outlet pipe delivering oil from the upper central portion of said receiving chamber into the outside of said casing; a deflecting chamber located under said receiving chamber; a deflecting partition interposed between said receiving chamber and said deflecting chamber and being provided with deflectors located in its peripheral region and having curved surfaces deflecting the oil circulating in the lowest peripheral region of the receiving chamber downwardly into said deflecting chamber, said deflecting partition being provided also with holes in its central portion permitting the rising of the lighter clean oil from said deflecting chamber into said receiving chamber; a settling chamber located under said deflecting chamber; a pair of settling partitions, one interposed between said deflecting chamber and said settling chamber, the other forming the bottom of said settling chamber, both being provided with drain holes permitting the passage the contaminants of the oil; a sludge chamber located under said settling chamber and being provided with a sloping bottom, a drain opening and a drain valve means for complete draining of the contents of said sludge chamber.

References Cited

UNITED STATES PATENTS

| | | | |
|---|---|---|---|
| 955,787 | 4/1910 | Freeman | 210—304 |
| 2,213,233 | 9/1940 | Tigner | 55—464 X |
| 2,354,856 | 8/1944 | Erwin | 210—522 X |
| 2,378,632 | 6/1945 | Hooker et al. | 210—512 |
| 2,861,650 | 11/1958 | Yellott et al. | 55—398 |
| 2,869,677 | 1/1959 | Yellott et al. | 55—398 X |
| 2,952,330 | 9/1960 | Winslow | 55—459 X |

FOREIGN PATENTS

| | | |
|---|---|---|
| 9,786 | 5/1895 | Great Britain. |
| 172,783 | 12/1921 | Great Britain. |

REUBEN FRIEDMAN, *Primary Examiner.*

F. SPEAR, *Assistant Examiner.*